J. H. BRUCE.
BAKING AND BROILING DEVICES.
No. 181,139. Patented Aug. 15, 1876.
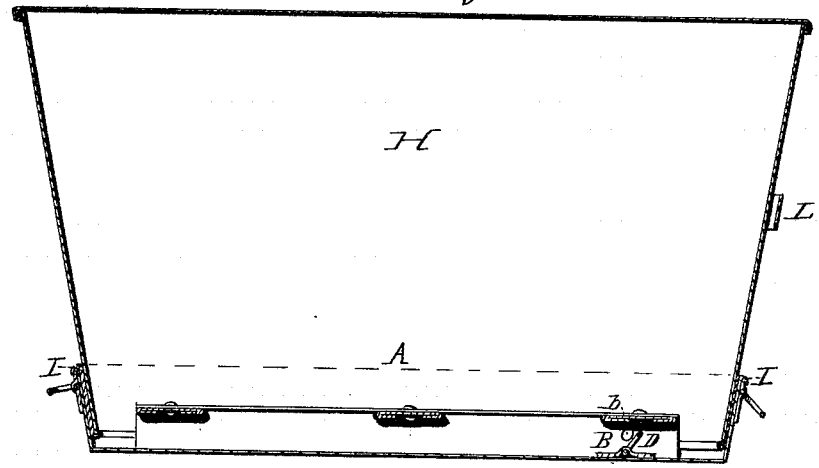
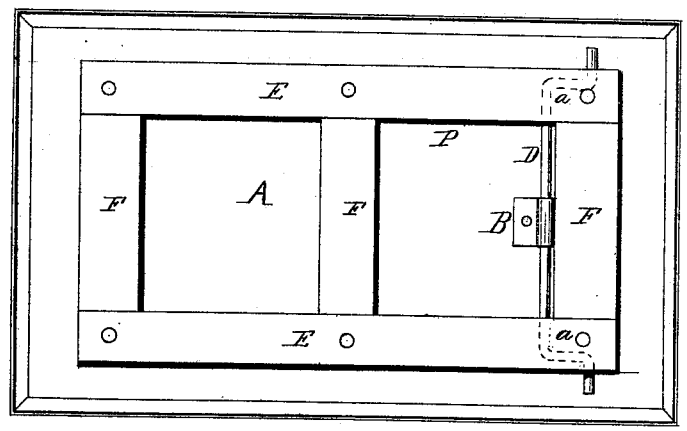

UNITED STATES PATENT OFFICE.

JOSEPH H. BRUCE, OF MERIDIAN, MISSISSIPPI.

IMPROVEMENT IN BAKING AND BROILING DEVICES.

Specification forming part of Letters Patent No. 181,139, dated August 15, 1876; application filed June 30, 1876.

*To all whom it may concern:*

Be it known that I, JOSEPH H. BRUCE, of Meridian, in the county of Lauderdale and State of Mississippi, have invented a new and useful Improvement in Baking and Broiling Devices, of which the following is a specification, reference being had to the accompanying drawings.

The invention relates to an improved combined baking and broiling device; and consists in the elements hereinafter specifically described.

Figure 1 is a central vertical longitudinal section of a device embodying the elements of the invention. Fig. 2 is a top view of the pan and broiling device.

In the accompanying drawings, A represents a pan of any desired shape, but preferably rectangular, to the upper surface of the bottom of which is secured the strap B, through which passes the rod D, the ends of which are bent upward and outward, forming the crank-angle $a$. It is clear that the pan A, with or without the rod D, may be used for baking. The broiling device P consists of the strips of metal E, the edges of which are bent downward to form supports for the device. The strips E are connected at proper intervals by the cross-pieces F, and near one end are provided with the apertures $b$ to receive the ends of the parts $a$, thus securing the broiling device in place, or permitting it to be turned up out of way when it is desired to clean the pan.

The top or cover H is properly conformed so that its base can fit tightly within the pan, which part is made of double material to give it requisite strength, the upper edge of the outer portion of the base being bent sharply downward to form the hollow rim or bead I, to receive the upper edge of the pan A when the cover is forced to place, and thus connect the parts in an air-tight manner, and thus the aroma of any food prepared within the device is preserved. A loop being attached, as shown at L, to the cover H, the device may be readily agitated, and thus employed for the purpose of roasting coffee or popping corn.

The contour of the broiling device should correspond with that of the pan A.

What I claim as my invention, and desire to secure by Letters Patent, is—

1. The cover H, having the double base and bead or rim I, in combination with the pan A, substantially as set forth.

2. The cover H, having the double base and rim I, in combination with the pan A, bar D, and broiling device P, substantially as shown and described.

In testimony that I claim the foregoing improvement in baking and broiling devices, as above described, I have hereunto set my hand this 11th day of May, 1876.

JOSEPH H. BRUCE.

Witnesses:
W. D. CAMERON,
McREA MOSBY.